No. 688,548.  
Patented Dec. 10, 1901.
D. A. RICCO.  
SWORD PISTOL.  
(Application filed Feb. 19, 1901.)
(No Model.)  
4 Sheets—Sheet 1.
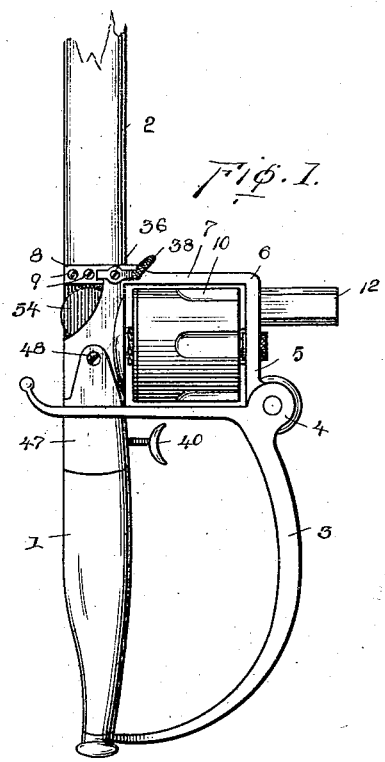
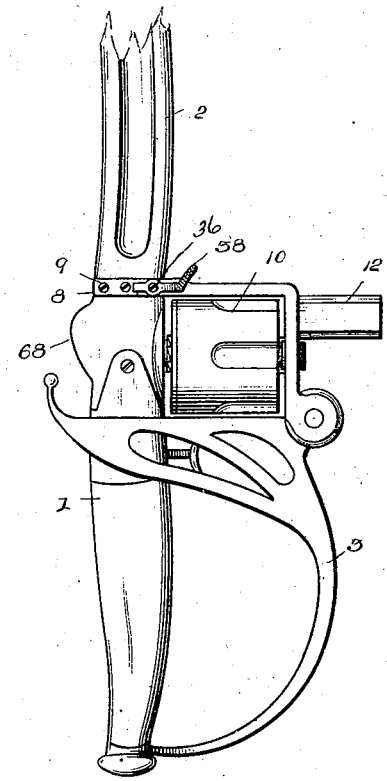
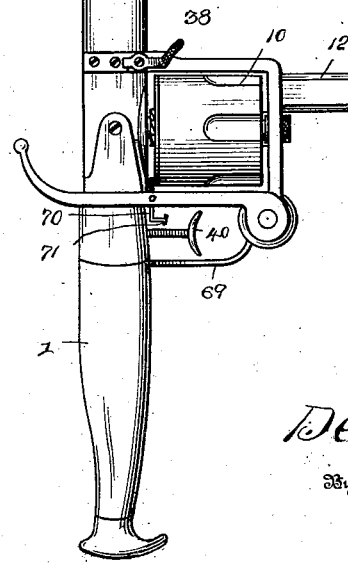
Witnesses  
F. W. Riley,  
H. Schmidt.
Inventor  
Domenic A. Ricco,  
By Victor J. Evans  
Attorney No. 688,548. Patented Dec. 10, 1901.
D. A. RICCO.
SWORD PISTOL.
(Application filed Feb. 19, 1901.)
(No Model.) 4 Sheets—Sheet 2.
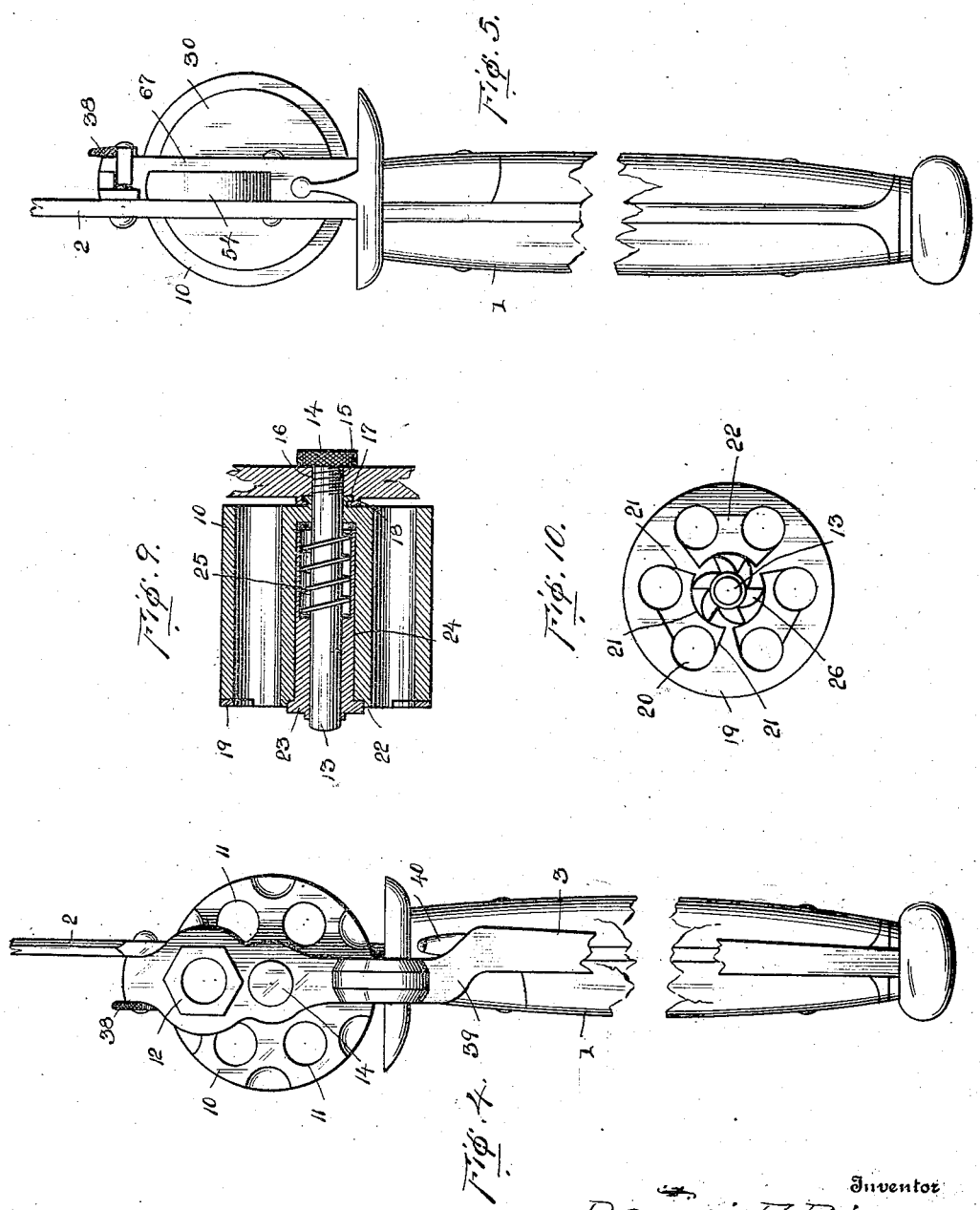

No. 688,548. Patented Dec. 10, 1901.
D. A. RICCO.
SWORD PISTOL.
(Application filed Feb. 19, 1901.)
(No Model.) 4 Sheets—Sheet 3.
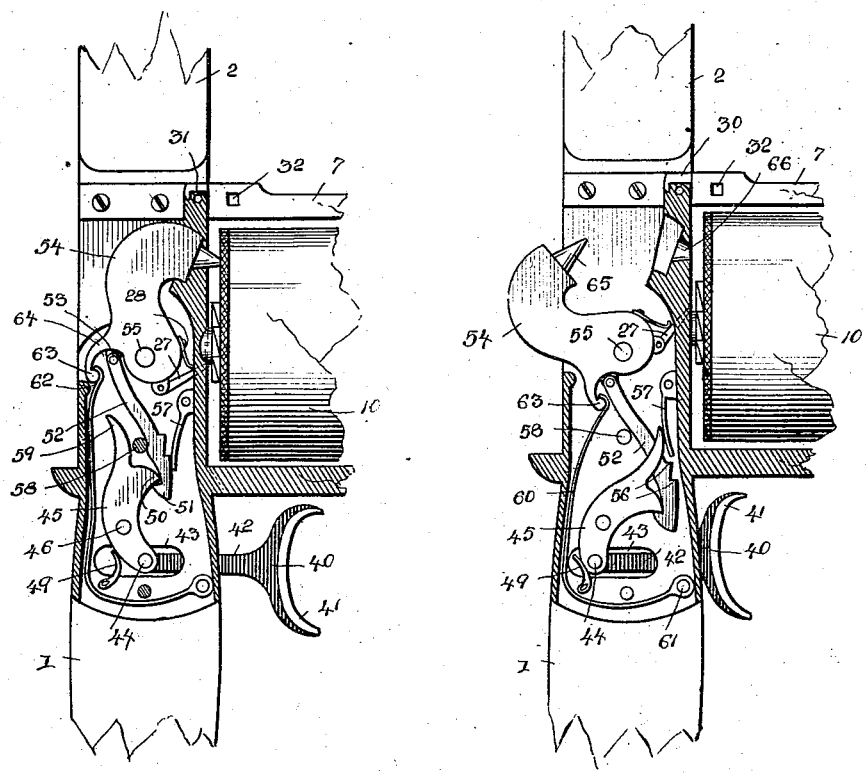
Fig. 6.   Fig. 8.   Fig. 7.
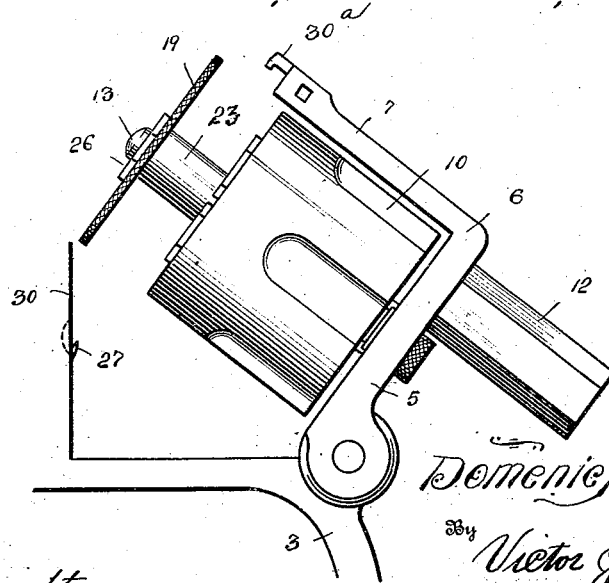
Witnesses
Inventor
Domenic A. Ricco,
By Victor J. Evans
Attorney No. 688,548. Patented Dec. 10, 1901.
D. A. RICCO.
SWORD PISTOL.
(Application filed Feb. 19, 1901.)
(No Model.) 4 Sheets—Sheet 4.
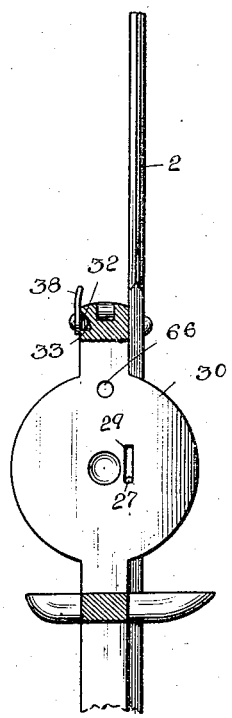
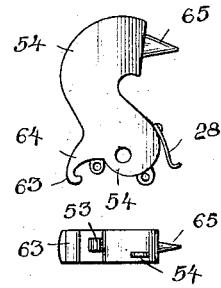
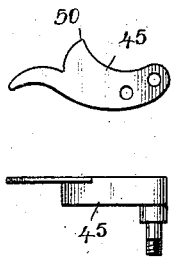
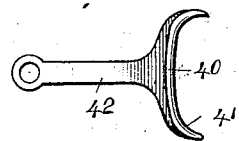
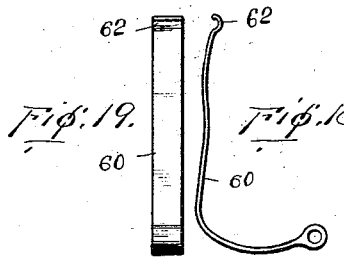
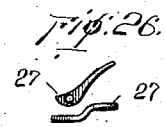
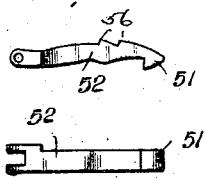
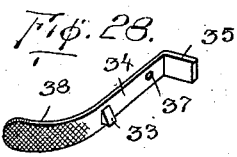
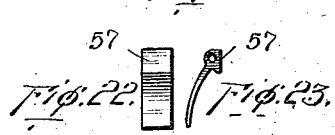
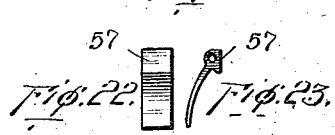
Witnesses
F. W. Riley,
H. Schmidt.
Inventor
Domenic A. Ricco,
By Victor J. Evans
Attorney

UNITED STATES PATENT OFFICE.

DOMENIC A. RICCO, OF LONG ISLAND CITY, NEW YORK.

SWORD-PISTOL.

SPECIFICATION forming part of Letters Patent No. 688,548, dated December 10, 1901.

Application filed February 19, 1901. Serial No. 47,936. (No model.)

*To all whom it may concern:*

Be it known that I, DOMENIC A. RICCO, a citizen of the United States, residing at Long Island City, in the county of Queens and State of New York, have invented new and useful Improvements in Sword-Pistols, of which the following is a specification.

This invention relates to pistol-swords, the principal object of the invention being to equip a sword with a small firearm resembling what is known in the art as a "revolver," the said revolver being so related to and positioned upon the sword that it may be operated and fired simultaneously or alternately with the use of the sword proper, thus placing in the hands of the user a duplex weapon of defense which will enable him to more successfully resist the attacks of an enemy. While the sword will be referred to hereinafter as such, it will be apparent as the description proceeds and the nature of the invention is better understood that the pistol or revolver element may be associated either with an ordinary straight-blade sword or a saber or a rapier or cutlass or other similar implements of warfare.

The detailed objects and advantages of the invention will appear more fully in the course of the ensuing description.

The invention consists in a pistol or shooting sword embodying certain novel features and details of construction and arrangement of parts, as hereinafter fully described, illustrated in the drawings, and incorporated in the claims.

In the accompanying drawings, Figure 1 is a side elevation of a portion of a sword, showing the relation of the revolver and its parts thereto. Fig. 2 is a similar view showing the firearm applied to a saber. Fig. 3 is a similar view showing the revolver applied to a rapier with the hand-guard omitted. Fig. 4 is a front elevation of the parts shown in Fig. 1 looking toward the muzzle of the barrel. Fig. 5 is a rear elevation of the same. Fig. 6 is a sectional view through the handle of the sword and the casing of the hammer-operating mechanism, showing the operating parts and connections between the trigger and hammer, &c. Fig. 7 is a similar view showing the hammer retracted, the trigger pushed inward, and the parts as they appear just prior to the snapping of the hammer. Fig. 8 is an enlarged detail side elevation showing the pivot-frame of the revolver-cylinder and showing the cartridge-ejector moved outward from the cylinder. Fig. 9 is a detail longitudinal section through the cylinder, showing the manner of interlocking the same with the cylinder-frame. Fig. 10 is a rear elevation of the cylinder and ejector. Fig. 11 is a front face view of the recoil-shield and the parts contiguous thereto. Fig. 12 is a side elevation of the hammer and its attachments. Fig. 13 is a bottom plan view thereof. Fig. 14 is a side view of the cocking-lever. Fig. 15 is an edge view of the same. Fig. 16 is a side elevation of the trigger. Fig. 17 is a rear end view thereof. Fig. 18 is a side or edge elevation of the mainspring which influences the hammer. Fig. 19 is a rear elevation of the same. Fig. 20 is a side elevation of the connecting rod or link. Fig. 21 is an edge view of the same. Fig. 22 is a rear elevation of the sear. Fig. 23 is an edge view of the same. Fig. 24 is a rear elevation of the trigger-spring. Fig. 25 is an edge view of the same. Fig. 26 is a side view of the cylinder-operating dog. Fig. 27 is an edge view thereof. Fig. 28 is a detail perspective view of the locking-catch which holds the cylinder-frame locked to the sword-blade.

Referring to the drawings, and particularly to Figs. 1, 2, and 3, 1 designates the hilt or handle of a sword, saber, or rapier, and 2 the blade thereof, the said parts being of any desired form and construction and the handle being provided with the usual hand-guard 3.

In carrying out the present invention the hand-guard 3 is provided with an offstanding ear 4, to which is pivotally connected one arm 5 of an L-shaped cylinder-frame 6, the other arm 7 of which is adapted to be detachably locked to a strip 8, extending transversely across one side of the sword-blade and connected thereto by suitable fastenings 9. The cylinder-frame is of a size adapted to receive and admit of the rotation of a revoluble cylinder 10, provided with a plurality of cartridge-holding chambers 11, the same as with an ordinary hand-revolver, and the frame is further provided with a barrel 12, which extends outward from the arm 5 of the frame 6 and at right angles thereto and to the general direction of the sword blade and handle and in line with the circumferential frame of the cartridge-receiving chambers of the cylinder 10. The cylinder 10 is provided with a central longitudinal bore for the reception of a cylinder-holding pin 13, which is provided at its outer end with a milled head 14 and adjacent thereto with a screw-threaded portion 15, adapted to be received in an internally-threaded opening 16 in the cylinder-frame, as best illustrated in Fig. 9. The cylinder is adapted to freely revolve on the pin 13 and is provided at its outer end with a flanged or grooved head 17, adapted to fit between a number of L-shaped keepers 18, arranged opposite each other or one above the other, so that the grooved or flanged head 17 may be introduced laterally between the keepers or removed in a like manner therefrom after the pin 13 has been withdrawn. When, however, said pin is in place, it prevents such lateral movement of the cylinder, and therefore holds it in engagement with the keepers, which in turn prevent the cylinder from moving longitudinally and becoming disengaged from the cylinder-frame when said frame is thrown upward after ejecting the cartridges, as illustrated in Fig. 8.

Mounted in the rear end of the cylinder 10 is a cartridge-ejector 19, which is in the form of a disk, having openings 20, which register with the cartridge-chambers in the cylinder, and further cut away on the lines 21, as in Fig. 10, to provide openings for the reception of thin flat projections 22 on the rear end of the cylinder, thereby obtaining an interlocked engagement between the cylinder and ejector-plate, as shown in Figs. 9 and 10. The ejector is further provided with an inwardly-extending sleeve 23, which fits slidingly into the central bore 24 of the cylinder and is adapted to receive a coil-spring 25, which fits within the sleeve 23 and encircles the pin 13, said spring being of the expansive type, so as to thrust the ejector-plate outward when the cylinder-frame is rocked upward, as in Fig. 8, thereby ejecting the cartridges, the flanges of which are engaged by and against the rear face of the ejector-plate 19. The ejector is further provided with a centrally-arranged ratchet-wheel 26, adapted to be engaged by a cylinder-actuating dog 27, pivotally connected to the hammer and held in engagement with the ratchet-wheel by means of a spring 28, the said dog projecting through a slot 29 in the recoil-shield 30, connected radially with the frame in rear of the cylinder 10, the said slot being best shown in Fig. 11. Thus as the hammer is oscillated the dog 27 is caused to actuate the cylinder by engaging successively with the teeth of the ratchet-wheel 26.

The arm 7 of the frame 6 is provided with a terminal hook 30ª, adapted to enter a recess in the casing of the sword-blade and to engage over a pin 31, connected with the sword-blade, as illustrated in Figs. 6 and 7, while said arm 7 is further provided with a socket 32 to receive a bevel-faced lug or catch-lip 33 of a locking and releasing spring 34, provided with a terminal foot 35, which enters a recess in the plate or strip 8, hereinabove referred to, for properly positioning the catch-spring, the spring being secured in place by means of a screw or other suitable fastening 36, passing through an opening 37 in the spring and into the strip 8. The spring 34 is provided with a thumb-piece 38, projecting from its outer end, by means of which the spring may be pressed outward, so as to disengage the lip or lug 33 from the socket 32, and thus provide for swinging the cylinder-frame upward and outward and also locking the same securely in its closed position.

The hand-guard 3 adjacent to its upper portion is deflected laterally, as shown at 39 in Fig. 4, so as to expose the trigger 40 and allow the same to be located in a plane at the opposite side of the sword-blade from the location of the hammer and its actuating mechanism. The trigger 40 comprises a finger rest or head 41, which slides in contact with one side of the sword-blade where the latter passes through the hilt or handle 1. In order to connect the shank 42 of the trigger with the hammer-operating mechanism, a transverse slot 43 is formed through the blade 2 to admit of the working of a pin 44, which connects with the lower end of a trigger-actuated lever 45, fulcrumed at 46 between the sword-blade 2 and a casing plate or cover 47, held in place by one or more screws or other fastenings 48. The trigger is normally pressed outward and held in that position by means of a small stiff trigger-spring 49, which is arranged within the casing and adapted to bear against the lower arm of the lever 45, as illustrated in Figs. 6 and 7, the tension of the spring being communicated by the lever to the trigger. The lever 45 is provided with a lip 50, adapted to engage a corresponding lip or shoulder 51 at or within the lower end of a connecting-rod 52, which is pivotally connected at its opposite end to the hammer at the point 53, slightly in rear of the fulcrum or pivot of the hammer, 54 designating the hammer and 55 the pivot thereof. The connecting-rod 52 is provided with one or more cocking-shoulders 56, adapted to be engaged by a spring-sear 57, mounted within the casing, as shown in Figs. 6 and 7, said sear operating normally to hold the connecting-rod against a stop-pin 58, arranged about centrally of the casing, in which the operative parts of the hammer-actuating mechanism are located. The lever 45 is further provided with a terminal lip or extension 59, which is adapted to come in contact with and operate upon the sear for disengaging the latter from the shoulders 56 of the connecting-rod 52 at a certain point in the operation of the mechanism hereinabove described. It will be seen that as the trigger is pressed inwardly and the lever 45 rocked the lips 50 and 51 will interlock, thereby drawing the connecting-rod 52 downward and drawing the hammer 54 back preparatory to exploding a cartridge, the hammer being retracted against the tension of a spring 60, constituting the mainspring of the firing mechanism, said spring being connected permanently at one end to a pin 61 and having its free end hooked, as shown at 62, to engage an enlargement or knob 63 on a lateral extension 64 of the hammer, said extension being located in rear of the pivot 55. As the connecting-rod 52 is drawn downward the sear 57 snaps into engagement successively with the cocking-shoulders 56, which will serve to hold the hammer cocked. By a further inward movement of the trigger the extension 59 of the lever 45 is brought to bear against the sear 57, which forces the sear out of engagement with the rod 52, and in the further movement of the lever 45 the shoulders 50 and 51 slide past each other and become disengaged, which releases the connecting-rod and allows the hammer to be thrust forward by the mainspring 60, causing the firing-pin 65 to pass through an opening 66, provided in the frame therefor, and to come in forced contact with the cartridge.

The casing in which the hammer-operating mechanism is located is comprised by the sword-blade 2 at one side and a plate 67 at the opposite side, the said plate 67 being arranged parallel to the sword-blade, as shown in Fig. 5, and at a sufficient distance therefrom to receive and house the hammer-operating mechanism, while the casing plate or cover 47 forms a detachable part of the housing. Said housing or casing may be left open at the back, as shown in Figs. 5, 6, and 7, in which case the hammer will project therefrom when moved backward, as shown in Fig. 7. It is in the scope of this invention, however, to provide the casing with a rearward extension 68, forming a chamber for the reception of the hammer when thrown back. It is also desirable in some constructions to provide a separate trigger-guard 69, connected with the handle 1, as shown in Fig. 3. It is also desirable in some cases to provide means for checking the rotation of the cartridge-cylinder, and by reference to Fig. 3 it will be seen that I have shown a small clutch-lever 70, fulcrumed intermediate its ends in the cylinder-frame and having one end arranged to be thrown in contact with the rear end of the cylinder or the cartridge-ejecting plate, while the opposite end of the lever is provided with a head or abutment 71, arranged in the path of the trigger-head 41, so that as the trigger-head approaches the limit of its inward movement it will strike against and operate the clutch-lever and cause the stoppage of the rotation of the cylinder.

From the foregoing description it will be seen that I have combined a sword and small firearm in very convenient form, so that the handle of the sword constitutes the handle of the firearm and either article of warfare may be used without changing the grip. For example, the firearm may be first brought into use until the cartridges have all been exploded, after which the device may be used as a sword, saber, or cutlass, as the case may be. The caliber of the firearm may be increased or diminished to correspond with the dimension or size of the sword in connection with which it is used. These and other changes in the form and proportion and minor details of construction may be resorted to without departing from the principles or sacrificing any of the advantages of the invention.

Having thus fully described my invention, what I claim as new, and desire to secure by Letters Patent, is—

1. The combination with a sword-handle; of a pivotally-mounted cartridge-cylinder frame; a rotatable cylinder carried thereby; a cylinder-pin; means for interlocking the cylinder with the cylinder-frame; a cartridge-ejector provided with a sleeve fitting into the cylinder; and an ejector-operating spring housed therein and coiled around the cylinder-pin.

2. The combination with a sword; of a rotatable cartridge-cylinder; a cylinder-frame pivotally secured at one end to the hand-guard of the sword; a firing mechanism comprising a hammer and operating connections therefor housed between the sword-blade and a casing-plate connected thereto and spaced apart therefrom.

3. The combination with a sword-blade; of a casing-plate parallel thereto; a firearm connected to the sword handle and blade and comprising a cylinder-supporting frame pivotally secured at one end to the hand-guard of the sword, a cylinder revolubly mounted in said frame, a hammer interposed between the blade and casing-plate; a trigger and operative connections between the trigger and hammer, said connections being arranged between the sword-blade and casing-plate.

4. The combination with a sword blade and handle; of a firearm connected thereto and comprising a cartridge-chamber; a hammer mounted on the blade; a trigger; a trigger-actuated lever; and a connecting-rod attached to the hammer and having means to interlock with the trigger-actuated lever.

5. The combination with a sword blade and handle; of a firearm connected thereto comprising a cartridge-chamber; a hammer mounted on the blade; a trigger also mounted on the blade; a trigger-actuated lever; a connecting-rod attached to the hammer and adapted to interlock with the trigger-actuated lever; and a sear arranged to coöperate with the connecting-rod.

6. The combination with a sword blade and handle; of a firearm connected thereto and comprising a cartridge-chamber; a hammer mounted on the blade; a trigger also mounted on the blade; a trigger-actuated lever; a connecting-rod attached to the hammer and having means to interlock with said lever; a sear for engaging the connecting-rod; and an extension on the trigger-actuated lever adapted to release the sear.

7. The combination with a sword blade and handle; of a firearm connected thereto and comprising a cartridge-chamber; a hammer mounted on the blade; a trigger mounted at the opposite side of the blade; a trigger-actuated lever operatively connected with the trigger by a pin working in a slot in the blade; and operative connections between the lever and hammer.

In testimony whereof I affix my signature in presence of two witnesses.

DOMENIC A. RICCO.

Witnesses:
PASQUALE GRIECO,
THOS. PATON.